May 3, 1955   E. V. HARDWAY, JR   2,707,393
APPARATUS FOR FLUID FLOW DETERMINATION
Filed Feb. 26, 1951   3 Sheets-Sheet 2
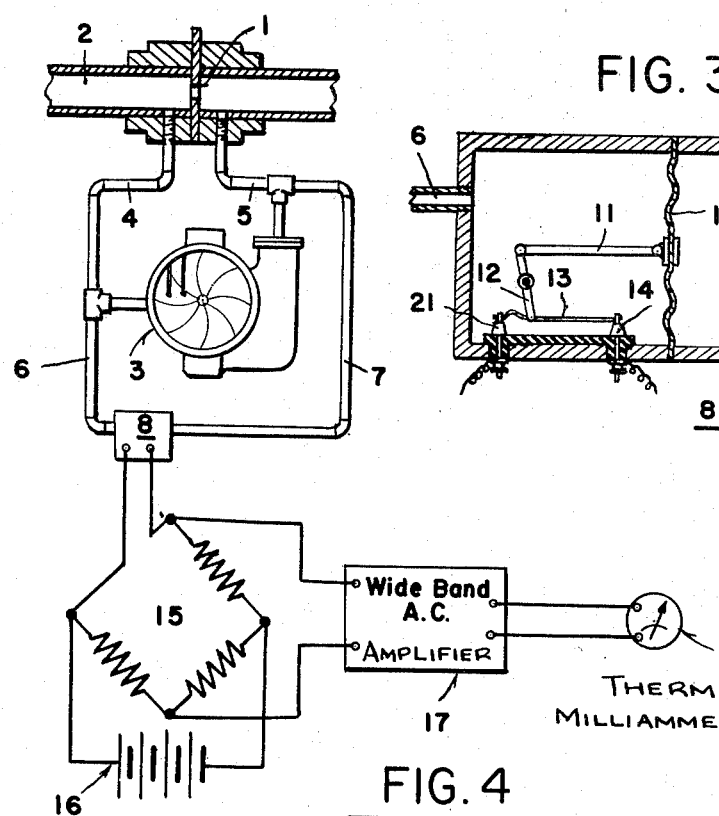
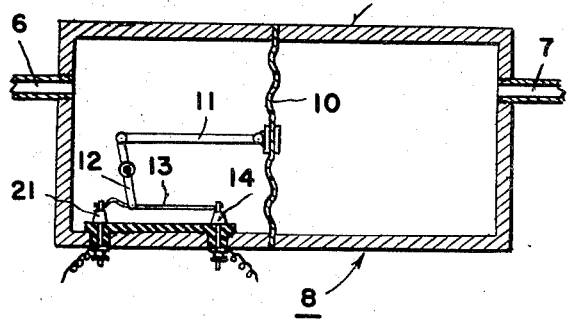
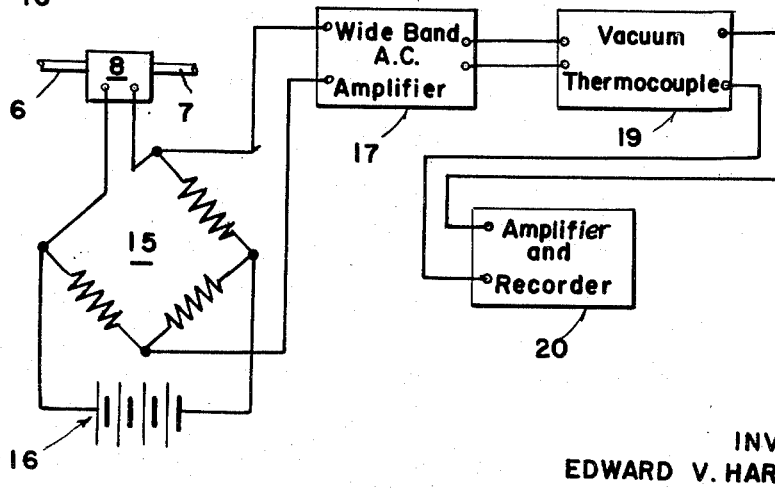
INVENTOR
EDWARD V. HARDWAY, Jr.
BY Stone, Boyden & Mack
ATTORNEYS.

United States Patent Office 2,707,393
Patented May 3, 1955

2,707,393

APPARATUS FOR FLUID FLOW DETERMINATION

Edward V. Hardway, Jr., Richmond, Va., assignor to The Beta Corporation, Henrico County, Va., a corporation of Virginia Application February 26, 1951, Serial No. 212,752

6 Claims. (Cl. 73—205)

This invention relates to the determination of fluid flow and particularly to an improved apparatus for accurately determining fluid flow in conduits, pipe lines, etc., when the flow is characterized by the presence of pulsations which are of relatively high frequency as compared to the effective rate of change of the fluid flow.

Fluid flow in conduits is ordinarily measured by means of the well known inferential head flow meter and it has long been recognized that such devices often give inaccurate results because of fluid flow pulsations. For example, where natural gas is transported by pipe lines extending for long distances, reciprocating compressors are used to maintain pressure in the pipe line, and such compressors set up pulsations which adversely affect the accuracy of the usual types of flow measuring devices.

Conventional flow meters respond to the average differential pressure across a restriction, such as an orifice, a flow nozzle, a venturi, or the like, interposed in the conduit. While flow meters in general respond to relatively slow variations of the differential pressure, they do not respond appreciably to periodic variations of a relatively high frequency, such as pulsations occurring on the order of one cycle per second and above. In most commercial instruments, the differential pressure along with other variables used to compute flow is recorded on a twenty-four hour chart, the total flow then being obtained by integration of the square root of the average differential pressure which in turn is proportional to the velocity of flow under steady flow conditions. The actual flow rate under pulsating conditions is proportional to the square root of the instantaneous differential pressure. When the flow is pulsating, the square root of the average differential pressure integrated over a given time interval is greater than the square root of the instantaneous differential pressure integrated over the same time interval. Consequently the flow indicated by the meter is greater than the true flow.

Accurate flow measurement in such cases is of great economic importance, and much work has been done in the past in an attempt to overcome the errors resulting from pulsations. Much of this work has been concerned with the reduction of the pulsations themselves, it having been at one time concluded that this was the more practical method of attacking the problem. In most cases, however, the reduction of pulsation requires expensive added storage capacity or the introduction of restrictions for damping the pulsations, necessitating additional compressor horsepower. No satisfactory method of compensating for errors due to pulsations in fluid flow measurement has, to my knowledge, been developed, and there has also been no satisfactory method for quantitatively determining the error, as in percent of the actual reading.

Perhaps the greatest improvement of the prior art is represented by the device shown in United States Patent 2,343,792, to J. E. Overbeck and S. R. Beitler. This device measures the maximum magnitude of the pulsation amplitude, that is, the peak value of the pulsations, so that it may be known whether the pulsations exceed a value which would make the reading of a conventional inferential head flow meter so inaccurate as to be unusable. Though valuable, this device does not solve the problem. First, it responds to the peak value of the pulsations, and thus often predicates its results on relatively isolated pulses of great magnitude which may have very little effect upon the accuracy of the flow meter. Second, the device only indicates the presence of a serious inaccuracy, and provides no means for compensating therefor. Also, the device assumes the pulsations to be sinusoidal, which they frequently are not.

An object of the present invention is to provide an apparatus for the accurate determination of fluid flow in a conduit or the like when such flow is characterized by pulsations which have a relatively high frequency as compared to the effective rate of change of the fluid flow.

A further object is to provide an apparatus whereby fluid flow may be measured by the differential pressure method and errors in such measurements resulting from pulsations in the fluid flow may be quantitatively determined.

Yet another object is to provide an apparatus for accurately determining fluid flow in a conduit or the like when such flow is characterized by pulsations having a relatively high frequency as compared to the effective rate of change of the fluid flow, such apparatus including a restriction in the conduit to establish a differential pressure, means for measuring the differential pressure to obtain an average differential pressure value, the square-foot of this value being approximately proportional to fluid flow, and means for simultaneously measuring a characteristic of the fluctuating component of the differential pressure, which characteristic may be employed in quantitatively correcting the value for fluid flow determined from said average differential pressure value.

In order that these and other objects may be understood in detail, reference is made to the accompanying drawings which form a part of this specification, and wherein:

Fig. 2 is a schematic diagram of one form of apparatus embodying the invention;

Fig. 3 is a vertical sectional view of the differential pressure sensing unit of an electromechanical transducer which may be employed in the apparatus shown in Fig. 2;

Fig. 4 is a schematic diagram showing a modification of the apparatus illustrated in Fig. 2.

Figure 1:
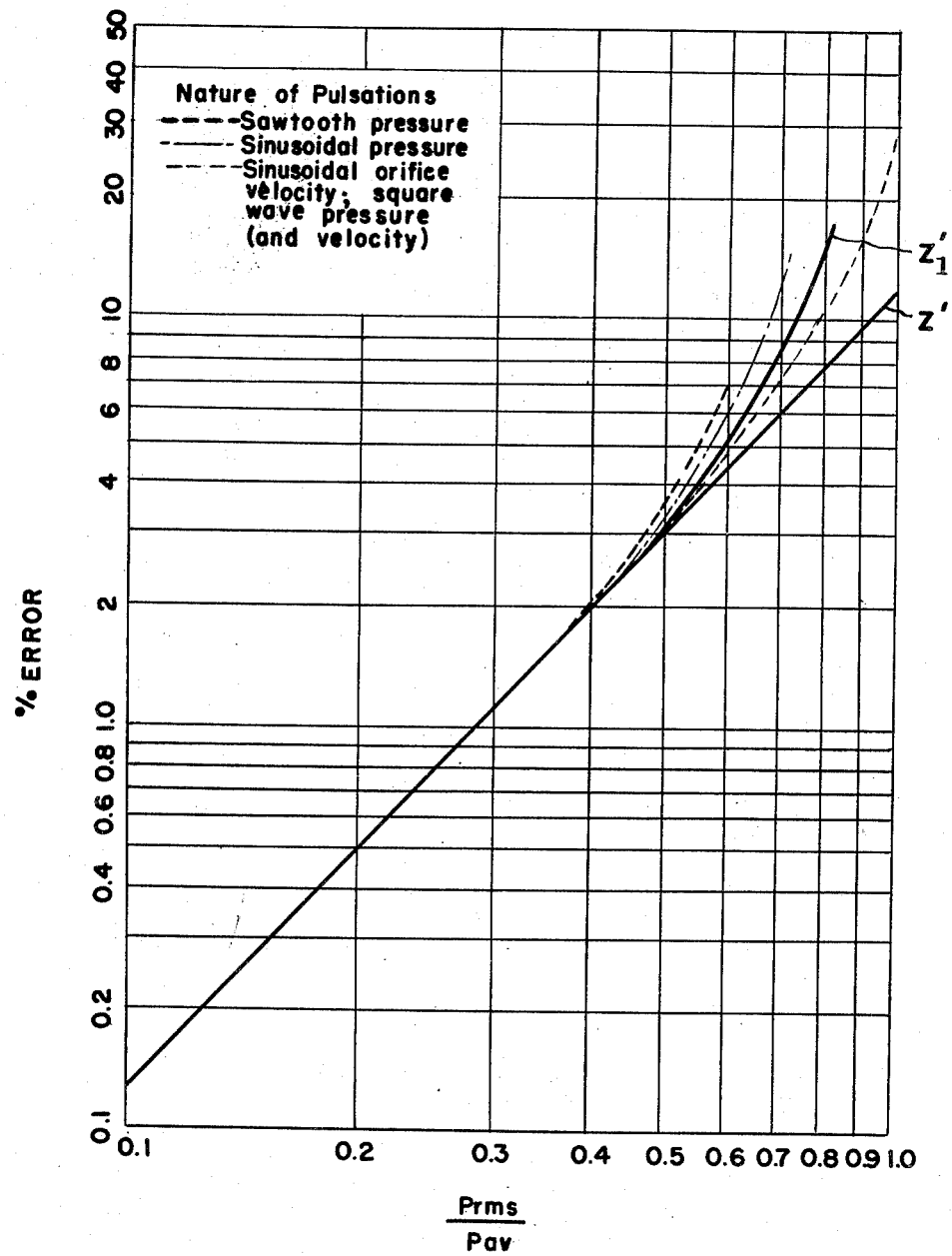
Fig. 1 is a chart showing curves for fluid flow measurement errors due to flow pulsations, as determined in accordance with my invention.

My invention is founded upon the discovery that errors in flow determinations by the differential pressure method bear a definite relation to the root-mean-square of the fluctuating component of the differential pressure. The basis for the invention can best be understood from a mathematical analysis of the conditions involved. The analysis which follows is based upon the following assumptions:

1. The relative density changes at the orifice or other restriction are small compared to the relative velocity fluctuations.

2. The significant changes in average differential pressure are slow or are abrupt and non-periodic and are measurable with a conventional flow meter, whereas the pressure pulsations which cause errors occur at frequencies to which the flow meter will not respond with appreciable amplitude. The fluctuating component of the differential pressure may be said to have a relatively high frequency as compared to the effective, or significant, rate of change of the differential pressure.

3. If the distance from the orifice pressure taps to the meter is short compared to the pulsation wavelengths, the error resulting from pulsations will depend upon the amplitudes and wavelengths of the various components of the pulsation waveform and can be determined by inferential pressure measurements.

4. The flow meter installation is designed to minimize other effects of pulsation errors such as unequal line volumes, unequal entrance and discharge coefficients to the extent that the true average differential pressure (or its square root) is indicated or recorded.

5. No velocity reversals occur at the orifice; therefore the maximum differential pressure fluctuation amplitude relative to the average is always less than one within the range of operation.

Definitions of mathematical symbols $P$ = instantaneous differential pressure across the orifice or restriction
$P_{av}$ = average value of differential pressure
$P_c$ = average value of differential pressure compensated to correct for pulsations
$V$ = instantaneous velocity in orifice or restriction
$V_{av}$ = average velocity in orifice or restriction
$T$ = fundamental pulsation period
$f_1(t)$ = velocity fluctuation defined by:

$$V = V_{av}[1 + f_1(t)]$$

$$\frac{1}{T}\int_0^T f_1(t)\,dt = 0$$

$f_2(t)$ = pressure fluctuation defined by $$P = P_{av}[1 + f_2(t)]$$

$$\frac{1}{T}\int_0^T f_2(t)\,dt = 0$$

$P_f$ = fluctuating component of differential pressure defined by:

$$P_f = (P - P_{av}) = P_{av}f_2(t)$$

$K_1^2$ = orifice coefficient defined by $P = K_1^2 V^2$
$K_2$ = flow rate coefficient defined by $Q = K_2 V_{av}$ $$P_{rms} = \sqrt{[P_f^2]_{av}}$$

$$r = \frac{P_{rms}}{P_{av}}$$

$Q$ = average flow rate through orifice
$Z$ = error due to pulsations, as shown by:

$$Z = \frac{Q(\text{measured}) - Q(\text{correct})}{Q(\text{measured})}$$

$Z'$ = a practical approximation of the error due to flow pulsations

The expressions for the theoretically correct flow rate and the flow rate as measured by a conventional orifice flow meter may be written, respectively as:

$$Q(\text{corr.}) = \frac{K_2}{K_1}\frac{1}{T}\int_0^T \sqrt{P}\,dt$$

$$Q(\text{meas.}) = \frac{K_2}{K_1}\frac{1}{T}\int_0^T \sqrt{P_{av}}\,dt$$

The error for pulsating conditions relative to the measured flow rate is then:

$$Z = \frac{Q(\text{meas.}) - Q(\text{corr.})}{Q(\text{meas.})} = \frac{\sqrt{P_{av}} - \frac{1}{T}\int_0^T \sqrt{P}\,dt}{\sqrt{P_{av}}}$$

Also:

$$\sqrt{P} = \sqrt{P_{av}}\sqrt{1 + f_2(t)}$$

It therefore follows that:

$$Z = 1 - \frac{1}{T}\int_0^T \sqrt{1 + f_2(t)}\,dt$$

The above integral $$\frac{1}{T}\int_0^T \sqrt{1 + f_2(t)}\,dt$$

can be rewritten with the integrand expanded in accordance with the binomial theorem. The integrand thus expanded becomes:

$$\sqrt{1 + f_2(t)} = 1 + \frac{1}{2}f_2(t) - \frac{1}{8}f_2^2(t) + \frac{1}{16}f_2^3(t) - \frac{5}{128}f_2^4(t) \ldots$$

In termwise integration to obtain the average value it is evident that the second term becomes zero by the definition of average differential pressure:

$$\frac{1}{2}\frac{1}{T}\int_0^T f_2(t)\,dt = 0$$

The fact that this term can be dropped from the expansion is a principal reason for the goodness of the approximate expression for error to be derived.

The coefficients become smaller for higher order terms but do not approach zero. The terms themselves, however, do approach zero for pulsation amplitudes less than unity (i. e., when velocity reversals do not occur in the orifice). That is, $f_2^n(t)$ approaches zero as $n$ approaches infinity, when the maximum of $f_2(t)$ is less than one.

In obtaining a first approximation, the cube term is dropped by virtue of the small coefficient, the higher power and the fact that the term will disappear in all cases of symmetrical wave forms. Higher order terms are likewise neglected by reason of their small magnitude when $f_2(t)$ is less than one. It is evident that the goodness of this first approximation is limited to some extent by the magnitude of the pulsation and the symmetry of the wave form.

The expression for $Z'$ is now defined:

$$Z' = 1 - \frac{1}{T}\int_0^T \left[1 - \frac{1}{8}f_2^2(t)\right]dt$$

or:

$$Z' = \frac{1}{8}\frac{1}{T}\int_0^T f_2^2(t)\,dt$$

Since $$f_2(t) = \frac{P_f}{P_{av}}$$

$$Z' = \frac{1}{8}\frac{[P_f^2]_{av}}{P_{av}^2} = \frac{1}{8}\left(\frac{P_{rms}}{P_{av}}\right)^2 = \frac{1}{8}r^2$$

$Z'$ is a practical approximation to the relative error in measured flow rate and is expressed entirely in terms of the average differential pressure, determinable by means of the conventional inferential head flow meter, and the root-mean-square of the fluctuating component of the differential pressure, which fluctuating component results from the pulsations and is measurable by means hereinafter described.

From the foregoing mathematical analysis, it will be apparent that fluid flow in a conduit or the like can be accurately determined when such flow is characterized by pulsations of relatively high frequency by the steps of (1) interposing a restriction in the conduit to establish a differential pressure; (2) measuring the differential pressure and obtaining an average value therefor; (3) simultaneously measuring the root-mean-square of the fluctuating component of the differential pressure resulting from said pulsations; (4) approximating the fluid flow from said average value of the differential pressure; (5) determining the error in the approximation according to the formula $$Z' = \frac{1}{8}r^2$$

and (6) accordingly correcting the approximate fluid flow value to obtain an accurate value.

In actual practice, a chart can be used for determining the error with substantial accuracy, the chart representing the curve obtained by plotting the expression Z' as a function of r and, if desired, the curves obtained by plotting the exact expressions for error computed for various wave forms, as seen in Fig. 1. The chart may, as shown, read directly in percent error. From Fig. 1, it will be noted that the approximate expression of the error, $$Z' = \frac{1}{8}r^2$$

is substantially completely accurate for all errors less than 2%, regardless of the wave form of the pulsations. For practical purposes, errors of as much as 8% can be determined to better than 1% accuracy for a wide variety of wave forms of pulsations, simply by employing the expression $$Z' = \frac{1}{8}r^2$$

Of course, an arbitrary calibration curve, such as the curve Z'₁ in Fig. 1, may be employed for closer accuracy, such arbitrary curve being made to approximate the curves for the particular wave forms involved.

One suitable apparatus for carrying out the method just described is shown in Fig. 2. Here, a restriction 1, such as an orifice plate, a flow nozzle, a venturi, or the equivalent, is interposed in the conduit 2 wherein the fluid flow is to be measured. The restriction 1 constitutes the so-called "primary device" of a conventional inferential head flow meter, the "secondary device" or differential pressure measuring means of the meter being shown at 3 and connected across the restriction 1 by means of conduits 4 and 5.

Connected across the restriction 1 by conduits 6 and 7, and in parallel with the meter 3, is the differential pressure sensing unit 8 of an electromechanical transducer. As seen in Fig. 3, the transducer unit comprises a casing 9 defining a chamber equally divided by a diaphragm 10, the conduits 6 and 7 being connected on either side of the diaphragm, as shown, so that the fluctuating component of the differential pressure at the restriction 1, Fig. 1, vibrates the diaphragm. Pivoted to the diaphragm is an arm 11, its free end being pivoted to one end of a centrally pivoted lever 12. The remaining end of the lever 12 is connected to a strain wire resistance 13, that is, a resistance wire which changes its resistance in response to strain. At one end, the strain sensitive resistance 13 is electrically connected to a suitable binding post 14, and at the other to a suitable connector 21.

The strain sensitive resistance 13 is connected in a Wheatstone bridge 15, Fig. 2, deriving its input from a suitable D. C. source 16 and having its galvanometer or output terminals connected to a wide band A. C. amplifier 17, which of course passes only the alternating current output of the bridge 15. The output of the amplifier 17 is connected to a thermo-milliameter 18, or to any other suitable electrical means responsive to the root-mean-square value of the voltage or current of the signal from the amplifier 17.

The restriction 1 causes the velocity of the fluid flowing in the conduit 2 to increase as the fluid passes through the restriction, thus establishing a differential pressure across the restriction which appears across the fluid lines 4 and 5 and 6 and 7. The secondary device 3 of the flow meter responds to the average differential pressure at the orifice or restriction 1, but is relatively unaffected by pulsations occurring in the fluid flow. Fluid flow pulsations result in a fluctuating component appearing in the differential pressure across the restriction 1, and this fluctuating component causes the diaphragm 10 of the transducer to vibrate in accordance with the nature of the flow pulsations. The strain responsive resistance 13 is connected to the diaphragm by the linkage 11—12 in such a manner that vibration of the diaphragm 10 imparts a periodically varying strain to the strain responsive resistance. The resistance is connected in one arm of the bridge 15, and its operation is thus to translate the vibrations of the diaphragm 10 into a periodically varying electrical signal appearing across the output points of the bridge, the periodic nature of this signal corresponding to the periodic nature of the flow pulsations in the conduit 2. The signal is amplified and applied to the indicator 18.

If the indicator 18 is a thermo-milliammeter, it has a slow response because of the thermal inertia of its thermocouple, and responds to the true root-mean-square of the current supplied by the amplifier 17. The indicating dial of the meter may be calibrated in terms of mean-square or root-mean-square pressure, and the value obtained therefrom, together with the average differential pressure value obtained by means of the meter 3, is employed to determine the error due to flow pulsations, as by using a graph such as shown in Fig. 1.

Figure 5:
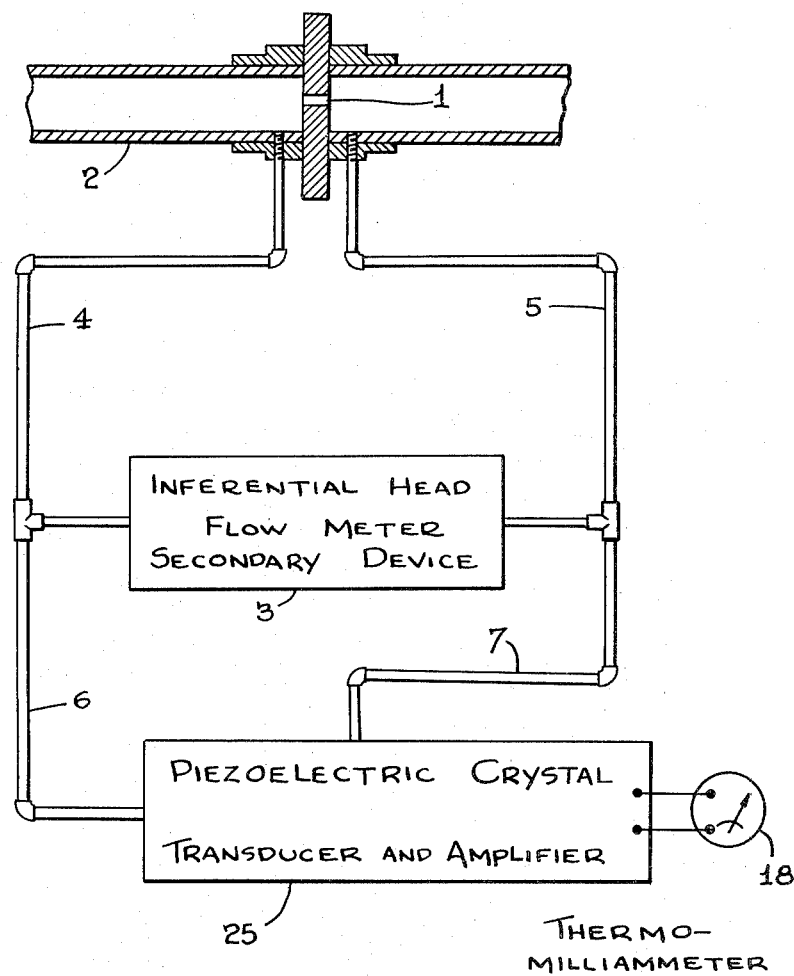
Fig. 5 is a diagrammatic view of a modification of the apparatus of Fig. 2.

The transducer illustrated, including the differential pressure sensing unit shown in Fig. 3 and the bridge circuit shown in Fig. 4, is purely illustrative, and it will be understood that other equivalent means may be employed. For example, a piezoelectric crystal may be employed to translate the fluctuating component of the differential pressure into a correspondingly varying electrical current, as shown in Fig. 5. In that figure, a piezoelectric crystal transducer and amplifier 25 is connected by pressure leads 6 and 7 across the restriction 1. The transducer and amplifier take the place of the electro-mechanical transducer 8, bridge 15, and A.-C. amplifier 17 of Fig. 2.

Similarly, while the electro-responsive means 18 has been described as a thermo-milliammeter, other equivalent means responsive to the mean-square or root-mean-square of the signal may be employed without departing from the scope of the invention.

In many applications, it may be desirable to record the root-mean-square value of the fluctuating component simultaneously with the record made by the conventional inferential head flow meter. To accomplish this, I may employ, as shown in Fig. 4, a vacuum thermocouple 19 in place of the meter 18, and an amplifier and recorder 20 to record the voltage output of the vacuum thermocouple. The vacuum thermocouple 19 may be of conventional construction, the proper device for the specific purpose being selected from a list such as contained in the catalog "Vacuum Thermocouples" of the American Thermo-Electric Company. The output of the vacuum thermocouple is a low level D. C. voltage related to the root-mean-square value of the current supplied by the A. C. amplifier.

I claim:

1. In combination in an apparatus for accurately measuring the flow of fluid in a conduit when such flow is characterized by pulsations which have a relatively high frequency as compared with the effective rate of change of fluid flow, an inferential head flow meter including a primary device and a secondary device, the primary device being a restriction in said conduit establishing a differential pressure across the restriction when fluid is flowing in the conduit, said differential pressure having a relatively steady component and a fluctuating component determined by said pulsations, and the secondary device being connected across the restriction and operative to measure the average value of the total differential pressure, means connected across said restriction in parallel with said secondary device, responsive to said fluctuating component of the differential pressure, and means responsive to the fluctuations of the last-mentioned means for indicating a quantity which is a function of the root-means-square of said fluctuating component.

2. In combination in an apparatus for accurately measuring the flow of fluid in a conduit when such flow is characterized by pulsations which have a relatively high frequency as compared with the effective rate of change of fluid flow, an inferential head flow meter including a primary device and a secondary device, the primary device being a restriction in said conduit establishing a differential pressure across the restriction when fluid is flowing in the conduit, said differential pressure having a relatively steady component and a fluctuating component determined by said pulsations, and the secondary device being connected across the restriction and operative to measure the average value of the total differential pressure, means including an electro-mechanical transducer connected by pressure leads across said restriction in parallel with said secondary device, said means being operative to produce an electrical signal in response only to said fluctuating component of the differential pressure, said electrical signal varying in proportion to said fluctuating component of the different pressure, and electrical means connected to said last-named means and supplied with said electrical signal for indicating a quantity related directly to the root-mean-square of said fluctuating component of the differential pressure.

3. The apparatus as defined in claim 2 in which said means including an electro-mechanical transducer further includes an A.-C. amplifier connected to said transducer supplied with its output, said electrical means being connected to said A.-C. amplifier and supplied with its output.

4. An apparatus for accurately determining the flow of fluid in a conduit, which flow is characterized by pulsations which have a relatively high frequency as compared with the effective rate of change of fluid flow, by establishing a differential pressure at a point in the conduit, said differential pressure having a relatively steady component and a fluctuating component determined by said pulsations, continuously measuring the total differential pressure to determine an average value $P_{av}$ approximately proportional to the fluid flow, continuously measuring the root-mean-square of the fluctuating component of the differential pressure to obtain a value $P_{rms}$, and then determining the error in said average value according to the formula $$Z' = \frac{1}{8} \frac{(P_{rms})^2}{(P_{av})^2}$$

comprising the combination of a restriction in the conduit establishing said differential pressure when fluid is flowing in the conduit, means for measuring the average value of the total differential pressure connected across said restriction, means including a differential pressure electromechanical transducer connected by pressure leads across said restriction in parallel with said measuring means, said transducer producing an output which varies in accordance with the fluctuating component of the differential pressure, means including an A.-C. amplifier controlled in accordance with variations in the output of the transducer and providing an electrical signal output varying only in response to said variations, and electrical means supplied with the electrical signal output of the amplifier responsive thereto to produce an indication of the root-mean-square of said electrical signal, said indication then being directly proportional to the root-mean-square of the fluctuating component of the differential pressure.

5. The apparatus defined in claim 4 in which said transducer includes a strain wire resistance variable in response to variations in the differential pressure, and said means including an A.-C. amplifier includes a combination of resistances and a source of D.-C. voltage connected to said strain wire resistance to form a D.-C. bridge therewith, the output of said bridge being supplied to said amplifier.

6. The apparatus of claim 4 in which said electrical means includes a vacuum thermocouple supplied with the electrical output signal of the A.-C. amplifier, and recording means connected to said thermocouple and responsive to its output.

References Cited in the file of this patent

UNITED STATES PATENTS

| 2,276,580 | Hofer | Mar. 17, 1942 |
| 2,343,792 | Overbeck et al. | Mar. 7, 1944 |
| 2,522,574 | Hagenbuck | Sept. 19, 1950 |

OTHER REFERENCES

Vacuum Thermocouples for Measuring Weak Alternating Currents by P. J. Kipp and Zonen, p. 472 of Instruments, Aug. 1931.